(12) United States Patent
Wang et al.

(10) Patent No.: US 9,549,337 B2
(45) Date of Patent: Jan. 17, 2017

(54) DYNAMIC BACKOFF IN WI-FI CALLING

(71) Applicant: Apple Inc., Cupertino, CA (US)

(72) Inventors: Xiaowen Wang, Cupertino, CA (US);
Ajoy K. Singh, Milpitas, CA (US);
Wen Zhao, San Jose, CA (US); Shu Du, Cupertino, CA (US); Kapil Chhabra, Milpitas, CA (US); Rudy E. Rawlins, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 49 days.

(21) Appl. No.: 14/501,870

(22) Filed: Sep. 30, 2014

(65) Prior Publication Data

US 2016/0073286 A1  Mar. 10, 2016

Related U.S. Application Data

(60) Provisional application No. 62/046,743, filed on Sep. 5, 2014.

(51) Int. Cl.
| | |
|---|---|
| *H04W 48/18* | (2009.01) |
| *H04W 76/00* | (2009.01) |
| *H04W 40/12* | (2009.01) |
| *H04W 40/16* | (2009.01) |
| *H04W 28/02* | (2009.01) |

(Continued)

(52) U.S. Cl.
CPC ..... *H04W 28/0236* (2013.01); *H04W 36/0022* (2013.01); *H04W 36/20* (2013.01); *H04W 48/18* (2013.01); *H04W 76/02* (2013.01); *H04W 36/14* (2013.01); *H04W 36/30* (2013.01);

(Continued)

(58) Field of Classification Search
CPC .............. H04W 84/12; H04W 72/082; H04W 74/0808; H04W 48/18; H04W 76/02; H04W 40/12; H04W 40/16; H04W 28/0236; H04W 36/0022; H04W 36/20; H04W 36/30; H04L 43/0894; H04L 5/0094; H04J 11/0023; H04Q 3/66
See application file for complete search history.

(56) References Cited

U.S. PATENT DOCUMENTS 7,346,357 B1 *  3/2008 Kim et al. .................... 455/453
8,077,675 B2 * 12/2011 Stephenson et al. ......... 370/331

(Continued)

*Primary Examiner* — Ayaz Sheikh
*Assistant Examiner* — Debebe Asefa
(74) *Attorney, Agent, or Firm* — Sterne, Kessler, Goldstein and Fox P.L.L.C.

(57) ABSTRACT

In order to improve the quality of a telephone call communicated over a wireless local area network (WLAN), an electronic device (such as a cellular telephone) may obtain one or more performance metrics based on communication with another electronic device (such as an access point) via a connection in the WLAN. For example, the electronic device may receive the one or more performance metrics from the other electronic device and/or may determine the one or more performance metrics based on the performance of the communication. Then, the electronic device may compare the one or more performance metrics with an interference criterion. If the interference criterion is met, the electronic device may perform a remedial action, such as selectively discontinuing use of the WLAN to communicate the telephone call for a time interval. Otherwise, the electronic device may continue using the WLAN to communicate the telephone call.

26 Claims, 6 Drawing Sheets

(51) Int. Cl.
*H04W 36/22* (2009.01)
*H04W 36/20* (2009.01)
*H04W 36/12* (2009.01)
*H04W 84/12* (2009.01)
*H04W 36/30* (2009.01)
*H04W 36/00* (2009.01)
*H04W 76/02* (2009.01)
*H04W 36/14* (2009.01)

(52) U.S. Cl.
CPC ............ *H04W 40/12* (2013.01); *H04W 40/16* (2013.01); *H04W 84/12* (2013.01)

(56) References Cited

U.S. PATENT DOCUMENTS 9,112,645 B2 * 8/2015 Hassan et al.
9,125,115 B2 * 9/2015 Kubota et al.

* cited by examiner

DYNAMIC BACKOFF IN WI-FI CALLING

CROSS-REFERENCE TO RELATED APPLICATION

This application claims priority under 35 U.S.C. §119(e) to U.S. Provisional Application Ser. No. 62/046,743, entitled "Dynamic Backoff in Wi-Fi Calling," by Xiaowen Wang, Ajoy K. Singh, Wen Zhao, Shu Du, Kapil Chhabra, and Rudy E. Rawlins, filed on Sep. 5, 2014, the contents of which are herein incorporated by reference.

BACKGROUND

Field

The described embodiments relate to techniques for improving communication performance in a wireless network. More specifically, the described embodiments relate to techniques for determining whether a wireless network can support Wi-Fi calling.

Related Art

Many modern electronic devices include a networking subsystem that is used to wirelessly communicate with other electronic devices. For example, these electronic devices can include a networking subsystem with a cellular network interface (UMTS, LTE, etc.), a wireless local area network interface (e.g., a wireless network such as described in the Institute of Electrical and Electronics Engineers (IEEE) 802.11 standard (which is sometimes referred to as 'Wi-Fi®') or Bluetooth® from the Bluetooth Special Interest Group of Kirkland, Wash.), and/or another type of wireless interface.

Because of the wireless-communication capability and the widespread availability of Wi-Fi access points, electronic devices are now being used to communicate telephone calls (which is sometimes referred to as 'Wi-Fi calling'). However, the ad-hoc deployment of the Wi-Fi access points, as well as the radio characteristics of the license-free spectrum using in Wi-Fi, can degrade the quality of Wi-Fi networks. This variable performance can result in dropped calls and poor call quality.

SUMMARY

The described embodiments relates to an electronic device that facilitates Wi-Fi calling. This electronic device includes: an antenna; and an interface circuit, coupled to the antenna, which communicates a Wi-Fi call with another electronic device using a connection in a wireless local area network (WLAN). The electronic device also include: a processor and memory. The memory stores a program module that is executed by the processor. This program module includes instructions for: obtaining one or more performance metrics based on the performance of the communication with the other electronic device; comparing the one or more performance metrics with an interference criterion; performing a remedial action when the interference criterion is met; and, otherwise, using the connection in the WLAN to communicate the Wi-Fi call.

Note that the WLAN may include a Wi-Fi network.

Moreover, obtaining the one or more performance metrics may involve calculating a performance metric. Furthermore, the one or more performance metrics may include: a received signal strength indicator from the other electronic device, a signal-to-noise ratio, a transmit packet error rate, a beacon error rate, a successful transmit data rate, a request-to-send failure rate, a successful receive data rate and/or a successful Transmission Control Protocol connection rate. In some embodiments, the one or more performance metrics include: an instantaneous value of a first performance metric, and/or an average value of a second performance metric.

Additionally, the interference criterion may include: a received signal strength indicator exceeding a first threshold and a transmit packet error rate exceeding a second threshold; a difference between a transmit packet error rate with and without request-to-send at a common data rate exceeding a third threshold; an increase in the transmit packet error rate during communication as a data rate is decreased; a number of request-to-send requests exceeding a fourth threshold; a decreasing data rate while the received signal strength indicator is approximately constant; a number of co-channel transmissions exceeding a fifth threshold; and/or a medium busy time exceeding a sixth threshold.

Moreover, the remedial action may include: avoiding using the WLAN for Voice-over-Internet-Protocol (VoIP) communication for a time interval, avoiding using an access point associated with the WLAN for VoIP communication for the time interval, and/or transitioning the communication of the Wi-Fi call to a cellular-telephone network. Note that the time interval may be increased after each instance of the remedial action.

Furthermore, the Wi-Fi call may be communicated using VoIP.

After the instructions for performing the remedial action, the program module may include instructions for selectively discontinuing the remedial action. For example, the remedial action may be selectively discontinued when: the interference criterion is no longer met, the connection is re-associated with another WLAN, the Wi-Fi call is communicated via a cellular-telephone network, the cellular-telephone network is unavailable, and/or a performance metric of the cellular-telephone network is less than a threshold.

Another embodiment provides a computer-program product for use with the electronic device. This computer-program product includes instructions for at least some of the operations performed by the electronic device.

Another embodiment provides an electronic device with an antenna and an interface circuit that is configured to perform at least some of the aforementioned operations of the program module.

Another embodiment provides a method for communicating the Wi-Fi call with the other electronic device using the connection in the WLAN, which may be performed by an embodiment of the electronic device. During operation, the electronic device obtains the one or more performance metrics based on the performance of the communication with the other electronic device. Then, the electronic device compares the one or more performance metrics with the interference criterion. Moreover, the electronic device performs the remedial action when the interference criterion is met. Otherwise, the electronic device uses the connection in the WLAN to communicate the Wi-Fi call.

Another embodiment provides a second electronic device. This second electronic device includes: an antenna; and an interface circuit, coupled to the antenna, which communicates with another electronic device using a connection in a WLAN. This second electronic device includes: a processor and memory. The memory stores a program module that is executed by the processor, and includes instructions for: obtaining one or more performance metrics based on the performance of the communication with the other electronic device; comparing the one or more performance metrics with a communication criterion, where the communication criterion is based on a beacon data rate during the communication; performing a remedial action when the communication criterion is met; and, otherwise, using the connection in the WLAN to communicate additional information.

Note that the remedial action may include transitioning to: another WLAN, and/or a cellular-telephone network.

Another embodiment provides a computer-program product for use with the second electronic device. This computer-program product includes instructions for at least some of the operations performed by the second electronic device.

Another embodiment provides a second electronic device with an antenna and an interface circuit that is configured to perform at least some of the aforementioned operations of the program module.

Another embodiment provides a method for communicating information with the other electronic device using the connection in the WLAN, which may be performed by an embodiment of the second electronic device. During operation, the second electronic device obtains the one or more performance metrics based on the performance of the communication with the other electronic device. Then, the second electronic device compares the one or more performance metrics with the communication criterion, where the communication criterion is based on a beacon data rate during the communication. Moreover, the second electronic device performs the remedial action when the communication criterion is met. Otherwise, the second electronic device uses the connection in the WLAN to communicate additional information.

This Summary is provided merely for purposes of illustrating some exemplary embodiments, so as to provide a basic understanding of some aspects of the subject matter described herein. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

Note that like reference numerals refer to corresponding parts throughout the drawings. Moreover, multiple instances of the same part are designated by a common prefix separated from an instance number by a dash.

DETAILED DESCRIPTION

In order to improve the quality of a telephone call communicated over a wireless local area network (WLAN), an electronic device (such as a cellular telephone) may obtain one or more performance metrics based on communication with another electronic device (such as an access point) via a connection in the WLAN. For example, the electronic device may receive the one or more performance metrics from the other electronic device and/or may determine the one or more performance metrics based on the performance of the communication. Then, the electronic device may compare the one or more performance metrics with an interference criterion. If the interference criterion is met, the electronic device may perform a remedial action, such as selectively discontinuing use of the WLAN to communicate the telephone call for a time interval. Otherwise, the electronic device may continue using the WLAN to communicate the telephone call.

In this way, this communication technique may improve the quality of the telephone call and, more generally, the communication between the electronic device and the other electronic device. For example, the communication technique may allow an interference condition to be reliably identified and avoided. Consequently, the communication technique may reduce user frustration and, thus, may improve the user experience when using the electronic device.

In general, the information communicated between the electronic device and the other electronic device in the communication technique may be conveyed in packets that are transmitted and received by radios in the electronic device and the other electronic device in accordance with a communication protocol, such as an Institute of Electrical and Electronics Engineers (IEEE) 802.11 standard, Bluetooth® (from the Bluetooth Special Interest Group of Kirkland, Wash.), a cellular-telephone communication protocol and/or another type of wireless interface. In the discussion that follows, Wi-Fi® is used as an illustrative example.

Figure 1:
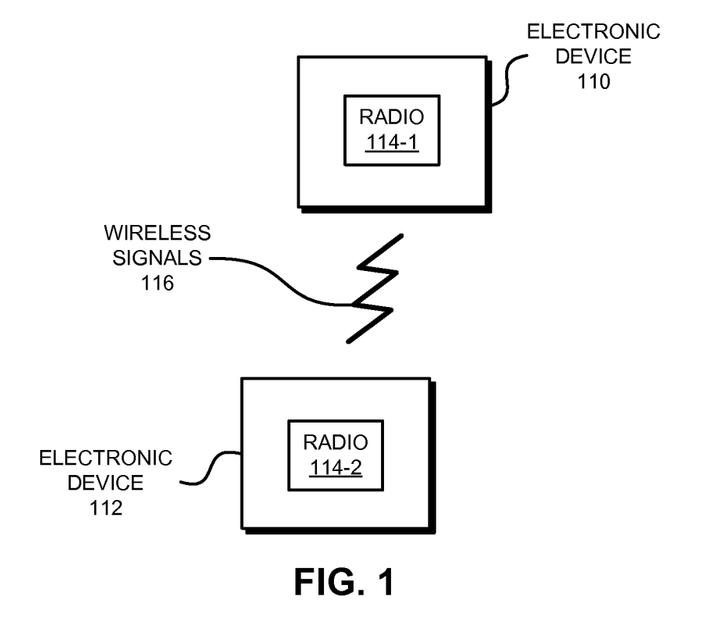
FIG. 1 is a block diagram illustrating electronic devices wirelessly communicating in accordance with an embodiment of the present disclosure.

The communication between the electronic devices is shown in FIG. 1, which presents a block diagram illustrating electronic devices 110 and 112 wirelessly communicating. In particular, these electronic devices may wirelessly communicate while: detecting one another by scanning wireless channels, transmitting and receiving beacons or beacon frames on wireless channels, establishing connections (for example, by transmitting connect requests), and/or transmitting and receiving packets (which may include the request and/or additional information as payloads).

Figure 6:
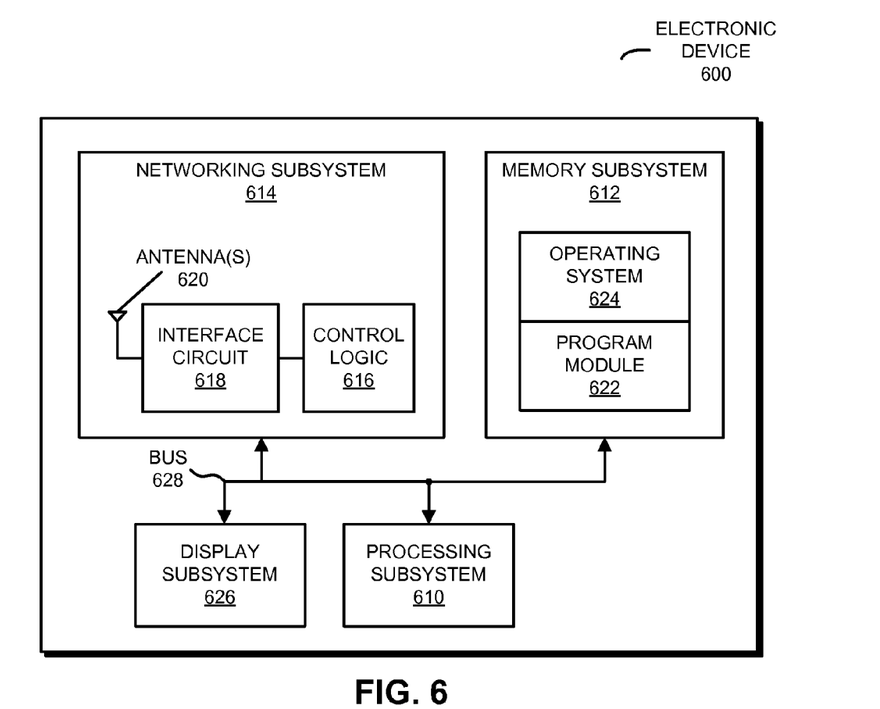
FIG. 6 is a block diagram illustrating one of the electronic devices of FIG. 1 in accordance with an embodiment of the present disclosure.

As described further below with reference to FIG. 6, electronic devices 110 and 112 may include subsystems, such as a networking subsystem, a memory subsystem and a processor subsystem. In addition, electronic devices 110 and 112 may include radios 114 in the networking subsystems. More generally, electronic devices 110 and 112 can include (or can be included within) any electronic devices with networking subsystems that enable electronic devices 110 and 112 to wirelessly communicate with another electronic device. This can comprise transmitting beacons on wireless channels to enable electronic devices to make initial contact with or detect each other, followed by exchanging subsequent data/management frames (such as connect requests) to establish a connection (which is sometimes referred to as a 'Wi-Fi connection'), configure security options (e.g., IPSec), transmit and receive packets or frames via the connection, etc.

As can be seen in FIG. 1, wireless signals 116 (represented by a jagged line) are transmitted by a radio 114-1 in electronic device 110. These wireless signals 116 are received by radio 114-2 in electronic device 112. In particular, electronic device 110 (such as a cellular telephone) may transmit packets with information to electronic device 112 (such as an access point in a WLAN or a Wi-Fi network). Alternatively or additionally, electronic device 112 may transmit packets with information to electronic device 110. For example, a user of electronic device 110 may conduct a telephone call with another user using a Voice-over-Internet Protocol (VoIP) on the WLAN (which is sometimes referred to as 'Wi-Fi calling' or a 'VoIP call over Wi-Fi'). More generally, the user may communicate data using Voice-over-Internet Protocol. This capability may be useful, such as when a cellular-telephone data communication protocol (e.g., LTE) is unavailable or has poor performance. In addition, this capability may allow the user to avoid roaming charges.

However, as noted previously, because many access points are deployed in an ad-hoc manner, and because of the radio characteristics of the license-free spectrum used in Wi-Fi, the quality of Wi-Fi networks is often more variable than cellular-telephone networks. Consequently, a Wi-Fi network may not always be usable for Wi-Fi calling. In order to prevent dropped calls and/or dropped packets, the communication technique implemented by electronic device 110 distinguishes between a 'good' Wi-Fi connection or Wi-Fi network from a 'bad' one. In particular, as described further below with reference to FIGS. 2 and 3, electronic device 110 may determine if the WLAN has an acceptable amount of interference. (In the present discussion, interference may be associated with neighboring Wi-Fi networks or stations, communication using other communication protocols, emissions from electronic devices such as a microwave oven, etc.) If yes, electronic device 110 may continue to use the WLAN for Wi-Fi calling and, more generally, communicating information using VoIP. However, if the WLAN has an unacceptable amount of interference, electronic device 110 may perform a remedial action, such as discontinuing using the WLAN for Wi-Fi calling and/or communicating information using VoIP.

For example, based on the performance of the communication using the connection, electronic device 110 may obtain one or more performance metrics. This may involve receiving the one or more performance metrics from electronic device 112 and/or calculating the one or more performance metrics. In general, a wide variety of performance metrics may be used, including: a received signal strength indicator (RSSI) from electronic device 112, a signal-to-noise ratio (SNR), a transmit packet error rate, a beacon error rate, a successful transmit data rate, a request-to-send (RTS) failure rate, a successful receive data rate, a successful Transmission Control Protocol (TCP) connection rate and/or a performance metric that (directly or indirectly) characterizes a quality of the communication between electronic devices 110 and 112. Note that the one or more performance metrics may include: an instantaneous value of a first performance metric, and/or an average value of a second performance metric. In particular, the average value may be determined using a low-pass filter, averaging of multiple measurements and/or systematic under-relaxation (e.g., $y(i)=\alpha \times \Delta y + (1-\alpha) \cdot y(i-1)$, where $\alpha$ is a convergence factor such as 0.1 or 0.16).

Then, electronic device 110 may compare the one or more performance metrics with an interference criterion. While RSSI can be used to assess the performance or the quality of the communication, RSSI alone is often insufficient for determining whether or not there is interference, and packets can get dropped even when the RSSI is good. Consequently, the interference criterion may include: an RSSI exceeding a first threshold (such as −65 dB) and a transmit packet error rate exceeding a second threshold (such as 10%); a difference between a transmit packet error rate with and without RTS at a common data rate exceeding a third threshold (e.g., when the transmit packet error rate is higher with RTS than without RTS); an increase in the transmit packet error rate during communication with electronic device 112 as the data rate is decreased (so that the transmit packet error rate at a lower data rate such as 6 Mbps exceeds the transmit packet error rate at a higher data rate such as 78 Mbps); a number of RTS requests received from electronic device 112 exceeding a fourth threshold (such as 1, 2, 5 or 10); a decreasing data rate received from electronic device 112 while the RSSI is approximately constant; a number of co-channel transmissions from other stations or WLAN networks exceeding a fifth threshold (such as 1, 2, 5 or 10); and/or a medium busy time exceeding a sixth threshold (such as 70-80% of the communication time). In an exemplary embodiment, the presence of interference is determined based on the average RSSI, a transmit packet error rate and an RTS metric. More generally, the interference criterion may indicate that the performance of the Wi-Fi connection and/or the Wi-Fi network is degraded or unacceptable (e.g., there is an increased risk of a dropped call and/or dropped packets) because of interference (or probable interference) associated with communication with or among other electronic devices (not shown).

If the interference criterion is met or achieved, electronic device 110 may perform a remedial action (which is sometimes referred to as 'dynamic backoff'). Otherwise, electronic device 110 may continue using the connection in the WLAN to communicate a Wi-Fi call and/or information using VoIP (i.e., electronic device 110 may continue normal processing of a Wi-Fi call, which may include checking additional conditions to determine if a Wi-Fi call can occur). Note that the remedial action may include: avoiding using the WLAN for VoIP communication for a time interval (such as 1, 5, 10, 30, 60 or 7200 min.), avoiding using an access point associated with the WLAN (such as electronic device 112) for VoIP communication for the time interval (such as blacklisting the associated basic service set identification or the service set identification), and/or transitioning the communication of the information to a cellular-telephone network. More generally, the remedial action may include one or more actions that reduce the likelihood of a dropped call and/or dropped packets on the Wi-Fi connection. Thus, the remedial action may include changing a Wi-Fi calling policy to try to use the cellular-telephone network whenever possible.

After performing the remedial action, electronic device 110 may perform one or more additional operations. For example, electronic device 110 may repeat the communication technique. If the remedial action is repeated, the time interval may be increased (such as by using an exponential backoff timer that doubles after each instance of the remedial action). In particular, the time interval may be increased after each instance of the remedial action. Alternatively or additionally, electronic device 110 may selectively discontinue the remedial action (such as by cancelling the backoff timer). For example, the remedial action may be discontinued when: the interference criterion is no longer met (i.e., the interference is improved or eliminated), the Wi-Fi connection is re-associated with another WLAN (such as a WLAN associated with another access point) or has switched to another channel, the information is communicated via a cellular-telephone network (i.e., electronic device 110 may transition the communication to a cellular-telephone network), the cellular-telephone network is unavailable or no longer available (so that in order to continue the communication the Wi-Fi network needs to be used), and/or a performance metric of the cellular-telephone network is less than a threshold (e.g., the communication performance on the Wi-Fi network may be better than the cellular-telephone network).

In an alternative embodiment of the communication technique (which is described further below with reference to FIGS. 4 and 5), electronic device 110 dynamically determines a roaming criterion (and, more generally, a communication criterion) for transitioning from the WLAN to another WLAN based on a data rate used in the communication. For example, the data rate may be associated with beacons transmitted by electronic device 112 (which is sometimes referred to as a 'beacon data rate'). Because the data rate associated with the beacons is known, electronic device 110 can use the beacons to obtain and/or to determine the one or more performance metrics.

Figure 4:
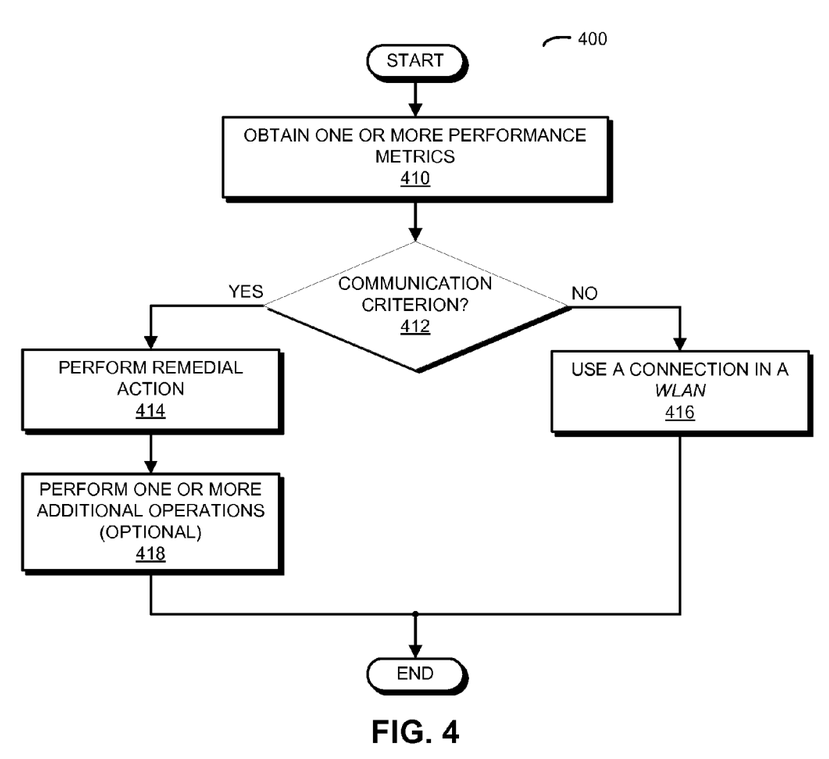
FIG. 4 is a flow diagram illustrating a method for communicating between the electronic devices of FIG. 1 in accordance with an embodiment of the present disclosure.
Figure 5:
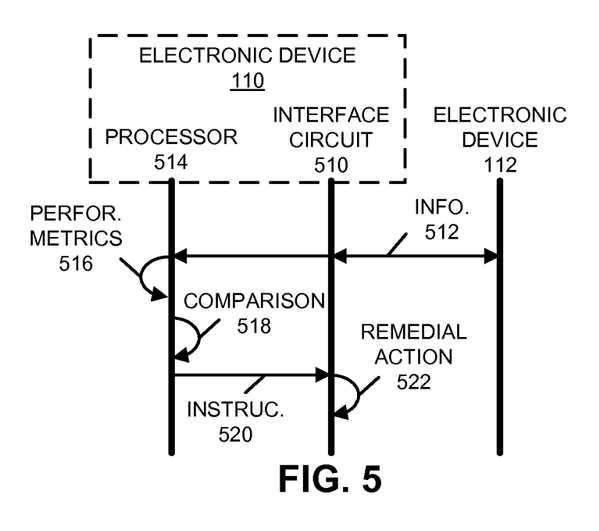
FIG. 5 is a drawing illustrating communication between the electronic devices of FIG. 1 in accordance with an embodiment of the present disclosure.

For example, after obtaining the one or more performance metrics based on the performance of the communication with electronic device 112, electronic device 110 may compare the one or more performance metrics with a communication criterion, where the communication criterion is based on a beacon data rate during the communication. If the communication criterion is met, electronic device 110 may perform a remedial action (such as transitioning the communication to another WLAN and/or a cellular-telephone network). Otherwise, electronic device 110 may use the connection in the WLAN to communicate information.

In particular, in a typical consumer Wi-Fi network, the beacon data rate may be 1 Mbps, while in an enterprise environment the beacon data rate may be 12 or 24 Mbps. As the beacon data rate increases, the coverage of the Wi-Fi network decreases or shrinks. Consequently, there may be more roaming, so that the chance of a Wi-Fi call handing off to a cellular-telephone network occurs more frequently.

In this embodiment of the communication technique, the roaming threshold (or the communication criterion) for Wi-Fi to Wi-Fi network transitions or Wi-Fi to cellular-telephone network transitions is dynamically selected based on the beacon data rate (and, more generally, the communication data rate). For example, in a home environment with a beacon data rate of 1 Mbps, a VoIP call can stay on a Wi-Fi network longer without sacrificing audio quality. Thus, in this case, the communication criterion may be an RSSI less than −85 dB and an SNR less than 3 dB. Alternatively, with a beacon data rate of 12 Mbps, the communication criterion may be an RSSI less than −80 dB and an SNR less than 12 dB.

In the described embodiments, processing a packet or frame in either of electronic devices 110 and 112 includes: receiving wireless signals 116 with the packet or frame; decoding/extracting the packet or frame from received wireless signals 116 to acquire the packet or frame; and processing the packet or frame to determine information contained in the packet or frame (such as the request or additional information in the payload, e.g., a Wi-Fi call).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

Figure 2:
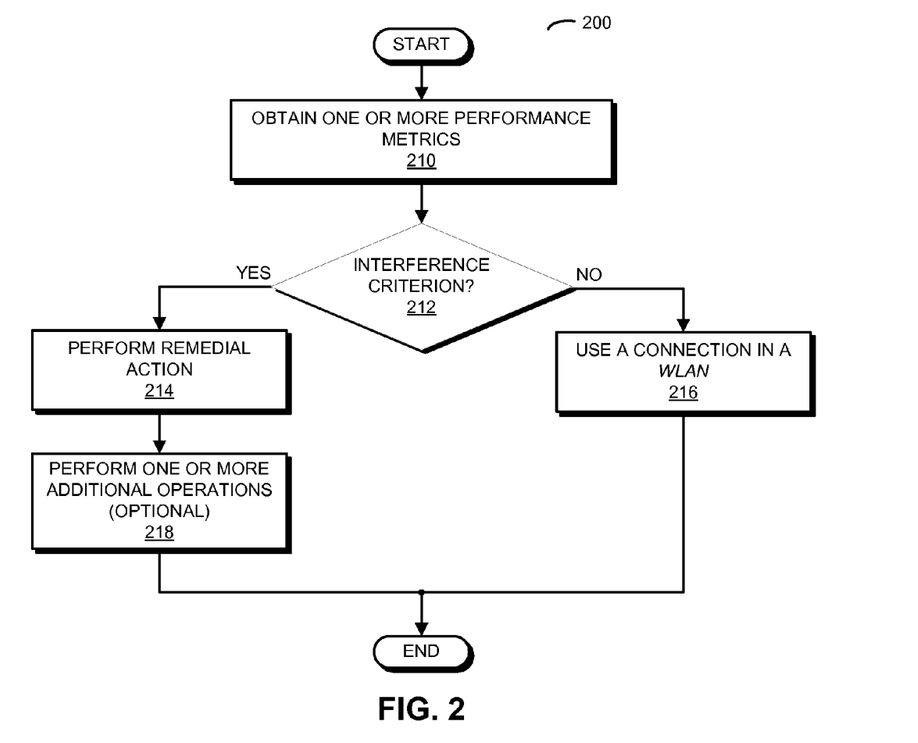
FIG. 2 is a flow diagram illustrating a method for communicating between the electronic devices in FIG. 1 in accordance with an embodiment of the present disclosure.

We now describe embodiments of a method. FIG. 2 presents a flow diagram illustrating method 200 for communicating between the electronic devices in FIG. 1, which may be performed by an electronic device (such as electronic device 110 in FIG. 1). During operation, the electronic device obtains the one or more performance metrics (operation 210) based on the performance of the communication with the other electronic device via the connection in the WLAN. Then, the electronic device compares the one or more performance metrics with the interference criterion. For example, the electronic device may determine whether the interference criterion is met or not (operation 212). In some embodiments, the interference criterion is met if the one or more performance metrics exceed and/or are less than one or more thresholds.

Moreover, the electronic device performs the remedial action (operation 214) when the interference criterion is met. Otherwise (operation 212), the electronic device uses the connection in the WLAN (operation 216) to communicate additional information (such as communicating information via VoIP).

In some embodiments, the electronic device optionally performs one or more operations (operation 218), such as discontinuing the remedial action.

In an exemplary embodiment, at least some of the operations in method 200 are performed by a program module that is executed in an environment (such as the operating system) of the electronic device. Alternatively, at least some of the operations in method 200 may be performed by an interface circuit in the electronic device.

Figure 3:
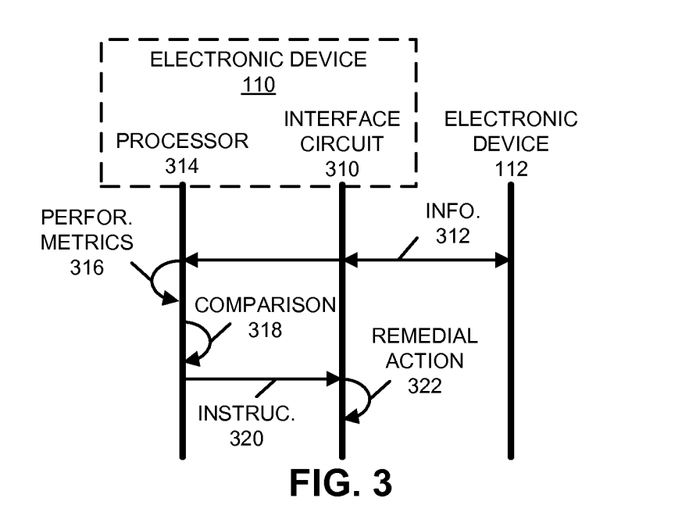
FIG. 3 is a drawing illustrating communication between the electronic devices of FIG. 1 in accordance with an embodiment of the present disclosure.

The communication technique is further illustrated in FIG. 3, which presents a drawing illustrating communication between electronic devices 110 and 112 (FIG. 1). In particular, interface circuit 310 in electronic device 110 may communicate information 312 with electronic device 112. Based on this communication, a processor 314 in electronic device 110 may determine one or more performance metrics 316. Then, processor 314 compares 318 the one or more performance metrics with the interference criterion. If the interference criterion is met, processor 314 provides an instruction 320 to interface circuit 310 to perform remedial action 322.

In these ways, the electronic device may facilitate reliable and high-quality communication between the electronic devices. In particular, there may be fewer dropped calls and/or dropped packets because of interference during Wi-Fi calls and/or communication using VoIP.

As noted previously, another embodiment of the communication technique may be used to dynamically select a roaming criterion or threshold (i.e., the communication criterion). This is shown in FIG. 4, which presents a flow diagram illustrating method 400 for communicating between the electronic devices in FIG. 1, which may be performed by an electronic device (such as electronic device 110 in FIG. 1). During operation, the electronic device obtains the one or more performance metrics (operation 410) based on the performance of the communication with the other electronic device via the connection in the WLAN. Then, the electronic device compares the one or more performance metrics with the communication criterion, where the communication criterion is based on a beacon data rate during the communication. For example, the electronic device may determine whether the communication criterion is met or not (operation 412). In some embodiments, the communication criterion is met if the one or more performance metrics exceed and/or are less than one or more thresholds.

Moreover, the electronic device performs the remedial action (operation 414) when the communication criterion is met. Otherwise (operation 412), the electronic device uses the connection in the WLAN (operation 416) to communicate additional information (such as communicating information via VoIP).

In some embodiments, the electronic device optionally performs one or more operations (operation 418), such as discontinuing the remedial action.

In an exemplary embodiment, at least some of the operations in method 400 are performed by a program module that is executed in an environment (such as the operating system) of the electronic device. Alternatively, at least some of the operations in method 400 may be performed by an interface circuit in the electronic device.

The communication technique is further illustrated in FIG. 5, which presents a drawing illustrating communication between electronic devices 110 and 112 (FIG. 1). In particular, interface circuit 510 in electronic device 110 may communicate information 512 with electronic device 112. Based on this communication, a processor 514 in electronic device 110 may determine one or more performance metrics 516. Then, processor 514 compares 518 the one or more performance metrics with the communication criterion. If the communication criterion is met, processor 514 provides an instruction 520 to interface circuit 510 to perform remedial action 522.

In these ways, the electronic device may facilitate reliable and high-quality communication between the electronic devices. In particular, if the WLAN coverage is sufficient (as determined based on the beacon data rate), the threshold for transitioning to another WLAN and/or a cellular-telephone network may be reduced. This dynamic roaming criterion may allow a user of the electronic device to use Wi-Fi calling advantageously, such as when the Wi-Fi network is capable of supporting Wi-Fi calling with good quality and with fewer transitions (and, thus, fewer dropped calls and/or dropped packets).

In some embodiments of methods 200 (FIG. 2) and 400 (FIG. 4), there may be additional or fewer operations. Moreover, the order of the operations may be changed, and/or two or more operations may be combined into a single operation.

We now describe embodiments of the electronic device. FIG. 6 presents a block diagram illustrating an electronic device 600, such as electronic device 110 in FIG. 1. This electronic device includes processing subsystem 610, memory subsystem 612, and networking subsystem 614. Processing subsystem 610 includes one or more devices configured to perform computational operations. For example, processing subsystem 610 can include one or more microprocessors, application-specific integrated circuits (ASICs), microcontrollers, programmable-logic devices, and/or one or more digital signal processors (DSPs).

Memory subsystem 612 includes one or more devices for storing data and/or instructions for processing subsystem 610 and networking subsystem 614. For example, memory subsystem 612 can include dynamic random access memory (DRAM), static random access memory (SRAM), and/or other types of memory. In some embodiments, instructions for processing subsystem 610 in memory subsystem 612 include: one or more program modules or sets of instructions (such as program module 622 or operating system 624), which may be executed by processing subsystem 610. Note that the one or more computer programs may constitute a computer-program mechanism. Moreover, instructions in the various modules in memory subsystem 612 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 610.

In addition, memory subsystem 612 can include mechanisms for controlling access to the memory. In some embodiments, memory subsystem 612 includes a memory hierarchy that comprises one or more caches coupled to a memory in electronic device 600. In some of these embodiments, one or more of the caches is located in processing subsystem 610.

In some embodiments, memory subsystem 612 is coupled to one or more high-capacity mass-storage devices (not shown). For example, memory subsystem 612 can be coupled to a magnetic or optical drive, a solid-state drive, or another type of mass-storage device. In these embodiments, memory subsystem 612 can be used by electronic device 600 as fast-access storage for often-used data, while the mass-storage device is used to store less frequently used data.

Networking subsystem 614 includes one or more devices configured to couple to and communicate on a wired and/or wireless network (i.e., to perform network operations), including: control logic 616, an interface circuit 618 and one or more antennas 620. For example, networking subsystem 614 can include a Bluetooth networking system, a cellular networking system (e.g., an 3G/4G network such as UMTS, LTE, etc.), a universal serial bus (USB) networking system, a networking system based on the standards described in IEEE 802.11 (e.g., a Wi-Fi networking system), an Ethernet networking system, and/or another networking system.

Networking subsystem 614 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' between the electronic devices does not yet exist. Therefore, electronic device 600 may use the mechanisms in networking subsystem 614 for performing simple wireless communication between the electronic devices, e.g., transmitting advertising or beacon frames and/or scanning for advertising frames transmitted by other electronic devices.

Within electronic device 600, processing subsystem 610, memory subsystem 612, and networking subsystem 614 are coupled together using bus 628. Bus 628 may include an electrical, optical, and/or electro-optical connection that the subsystems can use to communicate commands and data among one another. Although only one bus 628 is shown for clarity, different embodiments can include a different number or configuration of electrical, optical, and/or electro-optical connections between the subsystems.

In some embodiments, electronic device 600 includes a display subsystem 626 for displaying information on a display, which may include a display driver and the display, such as a liquid-crystal display, a multi-touch touchscreen, etc.

Electronic device 600 can be (or can be included in) any electronic device with at least one network interface. For example, electronic device 600 can be (or can be included in): a desktop computer, a laptop computer, a server, a media player (such as an MP3 player), an appliance, a subnotebook/netbook, a tablet computer, a smartphone, a cellular telephone, a piece of testing equipment, a network appliance, a set-top box, a personal digital assistant (PDA), a toy, a controller, a digital signal processor, a game console, a computational engine within an appliance, a consumer-electronic device, a portable computing device, a personal organizer, a sensor, a user-interface device and/or another electronic device.

Although specific components are used to describe electronic device 600, in alternative embodiments, different components and/or subsystems may be present in electronic device 600. For example, electronic device 600 may include one or more additional processing subsystems 610, memory subsystems 612, networking subsystems 614, and/or display subsystems 626. Additionally, one or more of the subsystems may not be present in electronic device 600. Moreover, in some embodiments, electronic device 600 may include one or more additional subsystems that are not shown in FIG. 6. For example, electronic device 600 can include, but is not limited to, a data collection subsystem, an audio and/or video subsystem, an alarm subsystem, a media processing subsystem, and/or an input/output (I/O) subsystem. Also, although separate subsystems are shown in FIG. 6, in some embodiments, some or all of a given subsystem or component can be integrated into one or more of the other subsystems or component(s) in electronic device 600. For example, in some embodiments program module 622 is included in operating system 624.

Moreover, the circuits and components in electronic device 600 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit may implement some or all of the functionality of networking subsystem 614, such as a radio. Moreover, the integrated circuit may include hardware and/or software mechanisms that are used for transmitting wireless signals from electronic device 600 and receiving signals at electronic device 600 from other electronic devices. Aside from the mechanisms herein described, radios are generally known in the art and hence are not described in detail. In general, networking subsystem 614 and/or the integrated circuit can include any number of radios. Note that the radios in multiple-radio embodiments function in a similar way to the described single-radio embodiments.

In some embodiments, networking subsystem 614 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals, e.g., determining if the received signal comprises an advertising frame, etc.)

While a communication protocol compatible with Wi-Fi standards was used as an illustrative example, the described embodiments of the communication technique may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the communication technique may be implemented using program module 622, operating system 624 (such as a driver for interface circuit 618) or in firmware in interface circuit 618. Alternatively or additionally, at least some of the operations in the communication technique may be implemented in a physical layer, such as hardware in interface circuit 618.

While the preceding embodiments used VoIP communication as an illustrative example, in other embodiments the communication technique may be applied to communication of arbitrary information or data via a connection in a WLAN.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. An electronic device, comprising:
   an interface circuit configured to communicate a Wi-Fi call with another electronic device using a connection in a wireless local area network (WLAN);
   a processor; and
   a memory, wherein the memory stores a program module, and wherein the program module is configured to be executed by the processor, the program module including:
   instructions for obtaining one or more performance metrics based on at least the performance of the communication with the other electronic device;
   instructions for comparing the one or more performance metrics with an interference criterion;
   instructions for performing a remedial action when the interference criterion is met;
   instructions for discontinuing the remedial action after a time interval, wherein the length of the time interval depends on at least a number of times that the remedial action has been taken; and
   instructions for using the connection in the WLAN to communicate the Wi-Fi call.

2. The electronic device of claim 1, wherein the one or more performance metrics include at least one of: a received signal strength indicator from the other electronic device, a signal-to-noise ratio, a transmit packet error rate, a beacon error rate, a successful transmit data rate, a request-to-send failure rate, a successful receive data rate and a successful Transmission Control Protocol connection rate.

3. The electronic device of claim 1, wherein the one or more performance metrics include at least one of: an instantaneous value of a first performance metric, and an average value of a second performance metric.

4. The electronic device of claim 1, wherein the interference criterion includes at least one of:
a received signal strength indicator exceeding a first threshold and a transmit packet error rate exceeding a second threshold;
a difference between a transmit packet error rate with and without request-to-send at a common data rate exceeding a third threshold;
an increase in the transmit packet error rate during communication as a data rate is decreased;
a number of request-to-send requests exceeding a fourth threshold; a decreasing data rate while the received signal strength indicator is approximately constant;
a number of co-channel transmissions exceeding a fifth threshold; and
a medium busy time exceeding a sixth threshold.

5. The electronic device of claim 1, wherein the remedial action includes at least one or more of:
avoiding using the WLAN for Voice-over-Internet-Protocol (VoIP) communication for a time interval,
avoiding using an access point associated with the WLAN for VoIP communication for the time interval, and
transitioning the communication of the Wi-Fi call to a cellular-telephone network.

6. The electronic device of claim 1, wherein the time interval is increased after each instance of the remedial action.

7. The electronic device of claim 1, wherein the Wi-Fi call uses VoIP.

8. The electronic device of claim 1, wherein the program module further includes, after the instructions for performing the remedial action, instructions for selectively discontinuing the remedial action.

9. The electronic device of claim 8, wherein the remedial action is selectively discontinued when at least one of the following occurs: the interference criterion is no longer met, the connection is re-associated with another WLAN, the Wi-Fi call is communicated via a cellular-telephone network, the cellular-telephone network is unavailable, and a performance metric of the cellular-telephone network is less than a threshold.

10. The electronic device of claim 1, wherein the program module further includes:
instructions for dynamically updating the interference criterion based at least on a coverage of the WLAN.

11. The electronic device of claim 1, wherein the program module further includes:
instructions for dynamically updating the interference criterion based at least on a determination of whether the WLAN is capable of supporting Wi-Fi calling.

12. An electronic device, comprising:
an interface circuit, coupled to an antenna, configured to communicate a Wi-Fi call with another electronic device using a connection in a wireless local area network (WLAN), wherein the interface circuit is further configured to:
obtain one or more performance metrics based on the performance of the communication with the other electronic device;
compare the one or more performance metrics with an interference criterion;
determine interference criterion is met;
perform a remedial action;
discontinue the remedial action after a time interval, wherein the length of the time interval depends on a number of times that the remedial action has been taken; and
use the connection in the WLAN to communicate the Wi-Fi call.

13. The electronic device of claim 12, wherein obtaining the one or more performance metrics involves calculating a performance metric.

14. The electronic device of claim 12, wherein the one or more performance metrics include at least one of: a received signal strength indicator from the other electronic device, a signal-to-noise ratio, a transmit packet error rate, a beacon error rate, a successful transmit data rate, a request-to-send failure rate, a successful receive data rate and a successful Transmission Control Protocol connection rate.

15. The electronic device of claim 12, wherein the interference criterion includes at least one of:
a received signal strength indicator exceeding a first threshold and a transmit packet error rate exceeding a second threshold;
a difference between a transmit packet error rate with and without request-to-send at a common data rate exceeding a third threshold;
an increase in the transmit packet error rate during communication as a data rate is decreased;
a number of request-to-send requests exceeding a fourth threshold;
a decreasing data rate while the received signal strength indicator is approximately constant;
a number of co-channel transmissions exceeding a fifth threshold; and
a medium busy time exceeding a sixth threshold.

16. The electronic device of claim 12, wherein the remedial action includes at least one or more of: avoiding using the WLAN for VoIP communication for a time interval, avoiding using an access point associated with the WLAN for VoIP communication for the time interval, and transitioning the communication of the Wi-Fi call to a cellular-telephone network.

17. The electronic device of claim 16, wherein the time interval is increased after each instance of the remedial action.

18. The electronic device of claim 12, wherein the Wi-Fi call uses VoIP.

19. The electronic device of claim 12, wherein the program module further includes, after the instructions for performing the remedial action, instructions for selectively discontinuing the remedial action.

20. A processor-based method for communicating a Wi-Fi call with another electronic device using a connection in a wireless local area network (WLAN), wherein the method comprises:
obtaining one or more performance metrics based on the performance of the communication with the other electronic device;
comparing the one or more performance metrics with an interference criterion;
using the processor, determining the interference criterion is met and performing a remedial action;
discontinuing the remedial action after a time interval, wherein the length of the time interval depends on a number of times that the remedial action has been taken; and
using the connection in the WLAN to communicate the Wi-Fi call.

21. An electronic device,
an antenna;
an interface circuit, coupled to the antenna, configured to communicate with another electronic device using a connection in a wireless local area network (WLAN);
a processor; and
a memory, wherein the memory stores a program module, and wherein the program module is configured to be executed by the processor, the program module including:
instructions for obtaining one or more performance metrics based on the performance of the communication with the other electronic device;
instructions for comparing the one or more performance metrics with a communication criterion, wherein the communication criterion is based on a beacon data rate during the communication;
instructions for performing a remedial action when the communication criterion is met;
instructions for discontinuing the remedial action after a time interval, wherein the length of the time interval depends on a number of times that the remedial action has been taken; and
instructions for using the connection in the WLAN to communicate additional information.

22. The electronic device of claim 21, wherein the remedial action includes transitioning to at least one of: another WLAN, and a cellular-telephone network.

23. An electronic device, comprising:
an interface circuit, coupled to an antenna, configured to communicate with another electronic device using a connection in a wireless local area network (WLAN), wherein the interface circuit is further configured to:
obtain one or more performance metrics based on the performance of the communication with the other electronic device;
compare the one or more performance metrics with a communication criterion, wherein the communication criterion is based on a beacon data rate during the communication;
determine that the communication criterion is met;
perform a remedial action based on at least the determination;
discontinue the remedial action after a time interval, wherein the length of the time interval depends on a number of times that the remedial action has been taken; and
use the connection in the WLAN to communicate additional information.

24. The electronic device of claim 23, wherein the remedial action includes transitioning to at least one of: another WLAN, and a cellular-telephone network.

25. A processor-based method for communicating information with another electronic device using a connection in a wireless local area network (WLAN), wherein the method comprises:
obtaining one or more performance metrics based on the performance of the communication with the other electronic device;
comparing the one or more performance metrics with a communication criterion, wherein the communication criterion is based on a beacon data rate during the communication;
performing a remedial action when the communication criterion is met;
discontinue a remedial action after a time interval, wherein the length of the time interval depends on a number of times that the remedial action has been taken; and
use the connection in the WLAN to communicate additional information.

26. The method of claim 25, wherein the remedial action includes transitioning to at least one of: another WLAN, and a cellular-telephone network.

* * * * *